B. L. GATES.
INDICATING GAUGE.
APPLICATION FILED AUG. 28, 1920.
1,425,193. Patented Aug. 8, 1922.
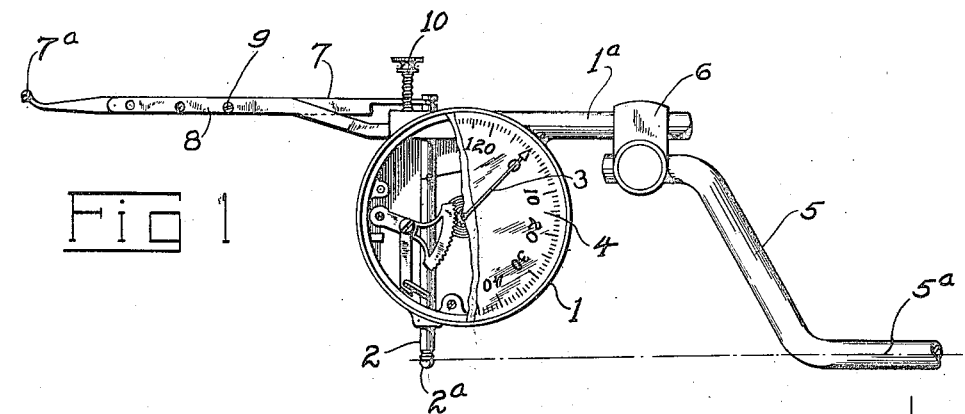
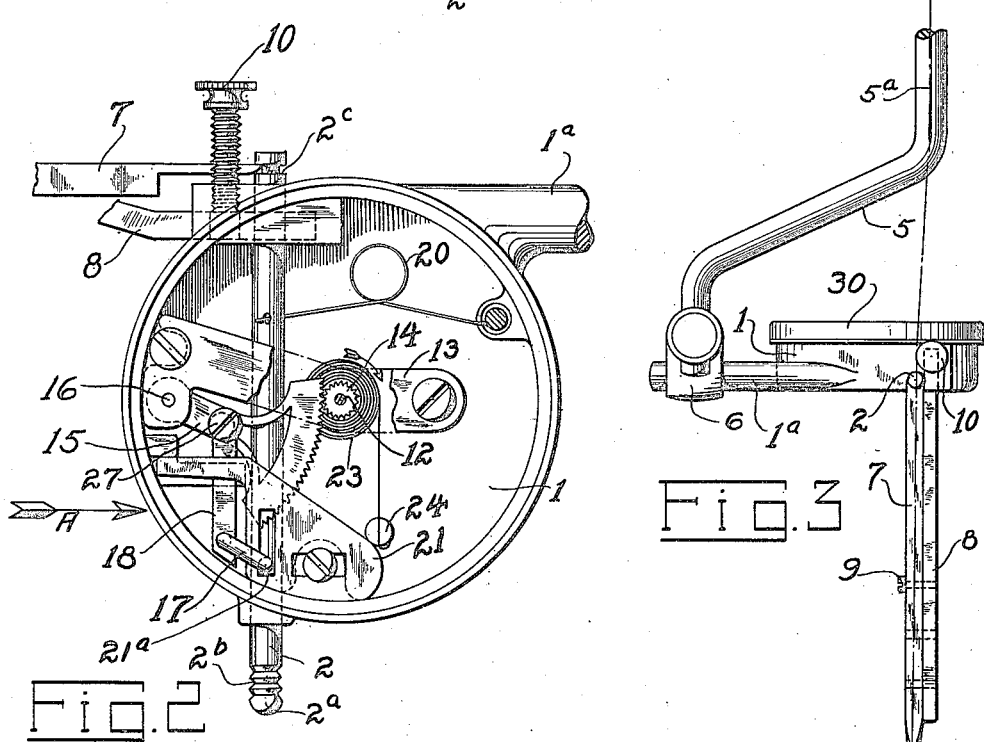
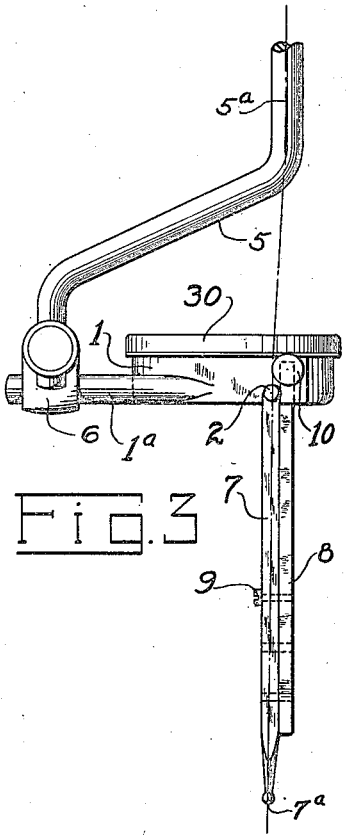
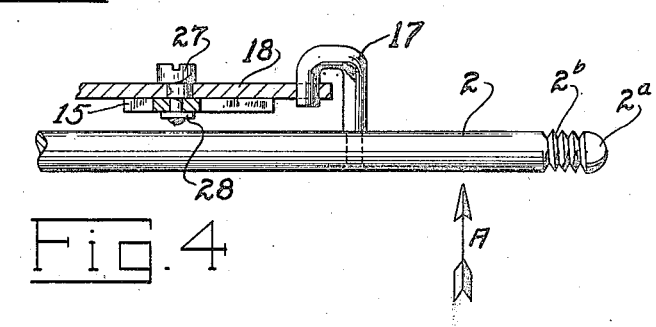
Inventor
BENJAMIN L. GATES
By Oliver O. Martin
His Attorney

UNITED STATES PATENT OFFICE.

BENJAMIN L. GATES, OF CHICAGO, ILLINOIS, ASSIGNOR TO ARTHUR E. BARILI, OF CHICAGO, ILLINOIS.

INDICATING GAUGE.

1,425,193.      Specification of Letters Patent.      Patented Aug. 8, 1922.

Application filed August 23, 1920. Serial No. 406,574.

*To all whom it may concern:*

Be it known that I, BENJAMIN L. GATES, a citizen of the United States, residing at Chicago, in the county of Cook and State of Illinois, have invented new and useful Improvements in Indicating Gauges, of which the following is a specification.

This invention has relation to a gauging device, and refers particularly to a dial indicating instrument of this type.

Primarily my object is the provision of a simple and inexpensive instrument of the type referred to. Furthermore I aim to provide an instrument more universal in its adaptation than any device of the same character hitherto produced. Another object is the provision of means for adjusting the relation of the parts of the instrument in order to correct inaccuracies in the parts and in the assembling of the device. A further object is to provide pivoted elements for reaching places heretofore inaccessible by a dial gauge, and for adjusting such elements relative to the indicating members of the gauge. The above objects and the many important and advantageous features of the invention are hereinafter clearly set forth, and a structure embodying the invention is illustrated in the appended drawings, of which:

Fig. 1 is a side elevation of the structure of my invention, and parts of the structure have been broken away in order to disclose the interior mechanism, Fig. 2 shows the indicator portion of the gauge on a larger scale, and the dial is in this view entirely removed for the sake of clearness, Fig. 3 illustrates an important adjustment of the structure, and Fig. 4 is a detail view on a large scale of parts removed from Fig. 2, and the arrows A—A indicate the relative direction from which the illustrations are viewed.

Referring in the first instance to Fig. 1, the numeral 1 denotes the casing of a dial gauge, through which extends a slidably fitted plunger 2, and said plunger is connected to rotate a pointer 3, which latter is proportioned to register with the graduations appearing on a dial 4. The gauge is supported by a Z-bar 5, and the connection between said bar and an arm 1$^a$ of the casing 1 takes the shape of a universal joint 6. It is noticed that said bar can be adjusted to bring the center line 5$^a$ of the outer portion of the bar into alignment with the plunger head 2$^a$, and also into the alignment indicated in Fig. 3, and these are the adjustments most commonly used, as will be appreciated by anyone versed in the art. The plunger 2 terminates at the lower end in a ball shaped head 2$^a$, which preferably is hardened and ground for contacting with the work to be gauged, and it is noticed that screw threads 2$^b$ are provided adjacent to said head for attachment of specially shaped contact heads. As such heads form no part of this invention, they are not illustrated in the drawing.

In the opposite end of said plunger is cut a circular groove 2$^c$, and in said groove is seated the inner end of a differentiating lever 7, which is pivotally mounted on an arm 8, said arm being insertable in a socket of the casing 1. The arm and lever are preferably square in cross section, and two square sockets are made in the casing at right angles to each other in order to hold said arm sidewise projected as shown in Fig. 1, or rearwardly extending as indicated in Fig. 3. The outer portion of the lever 7 terminates in a ball shaped head 7$^a$, which, similarly to the head 2$^a$ is provided for contacting with the work to be measured. Suitable means, such as a pivot screw 9, holds the lever pivotally in place on the arm 8, and it is noticed that said lever and arm are made with a plurality of registering perforations adapted to receive said screw. As shown assembled in Fig. 1, the fulcrum of the lever is centrally located, and the movement of the head 7$^a$ corresponds to the movement of the plunger head 2$^a$. But the farther the fulcrum is shifted toward the head 7$^a$, the finer readings may also be obtained on the dial of the gauge. If for example the graduations on the dial correspond to a plunger movement of one one thousand part of an inch, then the value would remain the same so long as the gauge remains assembled as shown, but the moment the fulcrum of the lever 7 is moved a corresponding change of value occurs. The bar 8 is retained in position in either socket of the case by suitable means, such as a set screw 10.

External readings are ordinarily obtained directly on the ball head of the plunger 2, and yet there are great many instances where the differential lever 7 is required for external gauging. And for internal gauging the said lever is, of course, indispensable, particularly in spaces too small for insertion of the whole instrument.

The internal mechanism of the gauge will now be described. The case 1 is provided with two aligned bearings for the plunger 2, and said plunger is carefully fitted in order to slide smoothly and yet not be loose in said bearings. In the center of the casing is placed a spindle 12, said spindle being pivotally suspended between the back wall of the casing and a fixed bridge 13. Said spindle has secured to it a toothed pinion 14 permanently in mesh with the teeth of a sector 15, and the latter is rigidly secured on a pivot 16. In the plunger 2 is rigidly fixed a U-shaped hook 17, and a link 18 extends from said hook to the sector 15, taking a position substantially parallel with the plunger. The parts described co-operate to convert the longitudinal movement of the plunger into a rotating movement of the spindle 12, and as said spindle carries the aforenamed pointer 3, it becomes clear to anyone versed in the art that the extent of such plunger movement is readable on the dial 4, as indicated by said pointer.

Suitable means, such as a spring 20, serves to maintain the plunger yieldingly projected, and it is noticed that the movement of the plunger is limited by the hook 17 touching the end of a perforation 21ᵃ of a fixed bridge 21. Said perforation extends lengthwise and parallel with the axis of the plunger, and the width of the perforation corresponds to the thickness of the hook, whereby the parts co-act to hold the plunger against turning. Upon the spindle 12 is hung a delicate clock spring 23, the free end of which is set in a post 24 of the casing. Said clock spring is adjusted to remain under tension, and the direction of its pull, as indicated by the arrow, tends to urge the pinion 14 in a clockwise direction, and this tendency, in turn, exercises an upward pressure upon the sector 15, which lighter pressure, it will be noticed, operates against the much stronger pressure of the plunger spring 20. It is not mechanically and commercially possible to fit a number of elements, such as here described, together so perfectly that all lost motion is eliminated, but by adjusting the springs to operate in opposition to each other it is made possible to draw all said elements yieldingly together, and thereby to eliminate the effect of lost motion.

Lost motion, however, is not the only factor which operates to affect the accuracy of an instrument of this character. It is also not mechanically and commercially possible to make the parts exactly of the required size and proportions, and for this reason the accuracy of the dial indicator gauges in public use is limited to the exactness of their parts. An important object of this invention, as hereinbefore stated, is to provide adjustment capable of correcting such inaccuracies, as will now be described. The link 18 is pivotally connected with the sector 15 through the medium of a stud 27, and this stud is made with a large shoulder portion riding in the link 18, as best shown in Fig. 4, and a smaller portion which is rotatable in the sector 15. A suitable friction washer 28 is placed on the stud adjacent to the sector 15, and the end of the stud is staked over this washer in order to retain the stud in position and so as to bring sufficient pressure to bear against the sector during the normal operation of the gauge, to maintain the stud unturned in the sector. The head of the stud is provided with a slot shaped to receive a screwdriver by means of which force enough may be applied to overcome the pressure of the washer 28, and the stud may be turned in the sector. Now it is noticed that the shoulder portion of the stud, which fits in the link 18, is eccentrically shaped, and that consequently a turning movement of said stud will bring the fulcrum of said link nearer to or farther from the pivoted center of the sector. The error of reading is less noticable between individual graduations of the dial, but the accumulation of errors seriously affect the usefulness of an instrument of this type, and those versed in the art will appreciate that a slight turn of the stud has a decided effect upon the throw of the pointer 3, and therethrough upon the accuracy of the instrument, which may, through the instrumentalities described, be set and adjusted to give accurate readings.

The dial of the gauge is made adjustable circumferentially by mounting said dial within a sleeve 30, which fits the outside periphery of the casing. When the instrument is set ready for operation, it may be found that the pointer 3 registers with some odd graduation. It is then only necessary to turn said sleeve 30, carrying the dial, until the zero graduation registers with the position of the pointer, and the reading of the instrument is greatly facilitated.

I claim:

1. In a dial indicator, a spindle carrying an indicating pointer, a plunger slidable in the indicator casing for rotating said spindle and having both ends projecting beyond the casing, one end of the plunger shaped for contacting with the work to be gauged, an external arm seated in the casing, a differentiating lever pivoted on said arm and engaging the opposite end of said plunger, said lever provided at the outer end with a contacting head.

2. In a dial indicator, a circular casing, a central spindle, a plunger slidable in the casing and having its opposite ends projecting beyond the casing, one end shaped for direct contact with the work to be gauged, means for translating the sliding movement of the plunger into a turning movement of the sipndle, means for adjusting the movement of the spindle relative to the movement of the plunger, and external contacting means engaging the other end of the plunger, said means adjustable to vary the throw of the plunger.

3. In a dial indicator, a circular dial, means traversing the circular body of the indicator and capable of contacting at each end with the work to be gauged, a rotary member for indicating the result obtained on said dial, means for maintaining said slidable member yieldingly projected, and means for yieldingly maintaining said rotary member in opposition to said sliding member for the purpose of eliminating lost motion between the parts.

4. In a dial indicator, a graduated dial, a pointer carrying spindle, a slidable member, means for connecting said member to rotate said spindle, means for adjusting said connecting means in order to correct the rotation of the spindle to the movement of said member, and means for contacting with the work to be gauged, said means connected to operate said sliding member and being adjustable in order vary the throw of said member and thereby to vary the fineness of the readings on the said dial.

5. In a dial indicator, a casing, a plunger slidable in said casing, a toothed sector, a link pivotally connected to said sector and the said plunger, a central spindle having a toothed pinion engaging said sector, a pointer on said spindle and operating upon the dial of the indicator, means on the spindle for yieldingly opposing the pressure of the plunger, and means for varying the throw of said sector relative to the movement of said plunger.

6. In a dial indicator, a casing, indicating mechanism in said casing supporting devices carried by said casing and including a universal joint, a differentiating lever on the casing for actuating the indicating mechanism and adjustable to vary the fineness of the indications obtained, and means for supporting said lever in different positions relative to the casing, substantially as described.

7. In a dial indicator, a casing, a central spindle carrying a pointer, slidable means for rotating said spindle and pointer, means for varying the rotation of the spindle relative to the movement of said sliding means, for the purpose of correcting inaccuracies in the structure, means for varying the movement of said slidable means for the purpose of obtaining finer or coarser readings, and a dial adjustable circumferentially to register with any position taken by said pointer.

8. In a dial indicator, a plunger, means for maintaining said plunger yieldingly projected, a gear sector, a spindle having a pinion in mesh with said sector, a hook on said plunger, a link from the hook to the sector, means for varying the movement of said sector relative to the throw of the plunger, and means for taking up lost motion between said plunger, sector and pinion.

9. In a dial indicator, a circular dial, a pointer carrying spindle centrally positioned relative to said dial, slidable means operatively connected to rotate said spindle, means for varying the rotation of said spindle relative to the movement of said sliding means, means for varying the movement of said sliding means, and means for eliminating lost motion between the parts.

10. In a dial indicator, a circular casing, a central spindle in said casing, a pointer and a pinion rigid on said spindle, a plunger transversely extending through and slidable in the casing, said plunger fitted to contact with the work to be gauged at each end, a gear sector pivotally seated in the casing in mesh with said pinion, a link connecting said plunger with the said sector, and means engaging said plunger for limiting the movement of the plunger.

11. In a dial indicator, a pointer carrying spindle, a sliding member shaped at one end for contacting with the work to be gauged, interconnecting devices for said spindle and member, a differentiating mechanism mountable on the indicator and operable upon the opposite end of said member, said mechanism provided with a work contacting head, and means for guiding and limiting the movement of said member.

12. In a dial indicator, a casing, a yieldingly projected plunger in said casing and shaped at one end for contacting with the work to be gauged, a pointer carrying spindle, connections between the plunger and spindle, said connections provided with means for adjusting the throw of the spindle relative to the throw of the plunger, means for limiting the throw of said plunger, and a differentiating mechanism operable upon the work to be gauged and connected with the opposite end of said plunger.

In testimony whereof I have hereunto affixed my signature.

BENJAMIN L. GATES.